United States Patent [19]
Watanabe et al.

[11] Patent Number: 4,511,176

[45] Date of Patent: Apr. 16, 1985

[54] VEHICLE BODY FLOOR CONSTRUCTION OF MOTOR VEHICLE

[75] Inventors: Hiroyuki Watanabe; Yasushi Tanaka, both of Toyota, Japan

[73] Assignee: Toyota Jidosha Kogyo Kabushiki Kaisha, Aichi, Japan

[21] Appl. No.: 383,964

[22] Filed: Jun. 1, 1982

[30] Foreign Application Priority Data

Jun. 12, 1981 [JP] Japan .................................. 56-90277
Sep. 9, 1981 [JP] Japan ................................ 56-141888

[51] Int. Cl.³ ............................................. B62D 21/00
[52] U.S. Cl. .................................. 296/204; 280/5 A; 180/89.1
[58] Field of Search ............... 296/204, 205, 185, 188, 296/189, 203, 208; 280/5 A; 180/89.1, 271

[56] References Cited

U.S. PATENT DOCUMENTS

| | | | |
|---|---|---|---|
| 1,366,247 | 1/1921 | Cowan | 280/5 A |
| 2,101,057 | 12/1937 | Fuller | 180/215 |
| 2,488,978 | 11/1949 | Julien et al. | 296/204 |
| 2,612,964 | 10/1952 | Hobbs | 296/64 |
| 3,285,359 | 11/1966 | Weeks et al. | 280/5 A |
| 3,423,122 | 1/1969 | Wessells | 296/185 |
| 3,983,952 | 10/1976 | McKee | 296/185 |
| 4,394,925 | 7/1983 | Rump et al. | 280/5 A |

FOREIGN PATENT DOCUMENTS

| | | |
|---|---|---|
| 488080 | 11/1952 | Canada ................................ 296/203 |
| 7138987 | 10/1971 | Fed. Rep. of Germany . |
| 2291887 | 11/1974 | France . |
| 996139 | 6/1963 | United Kingdom . |

OTHER PUBLICATIONS

*Designing Tomorrow's Cars,* Korff, 1980, M-C Publications, Burbank, California, pp. 244–248.

*Primary Examiner*—Robert B. Reeves
*Assistant Examiner*—Dennis H. Pedder
*Attorney, Agent, or Firm*—Parkhurst & Oliff

[57] ABSTRACT

A vehicle body floor construction of a motor vehicle, wherein a tunnel upwardly projecting from the surface of a floor panel and disposed in a longitudinal direction of the vehicle is formed at the central portion in the widthwise direction of the floor panel and includes a fuel tank disposed therein, and said tunnel is made to serve as an armrest for an occupant at the upper surface thereof at an inner side of an occupant's seat.

7 Claims, 13 Drawing Figures

VEHICLE BODY FLOOR CONSTRUCTION OF MOTOR VEHICLE

BACKGROUND OF THE INVENTION

1. Field of the Invention

This invention relates to a vehicle body floor construction of a motor vehicle, and more particularly to a vehicle body floor construction of a motor vehicle, wherein a tunnel upwardly projecting from the surface of a floor panel and disposed in the longitudinal direction of the vehicle is formed at the central portion in the widthwise direction of the floor panel and a fuel tank is disposed in the tunnel.

2. Description of the Prior Art

In general, in a motor vehicle, particularly, a passenger vehicle, a fuel tank has been disposed at the back of seats located at the rear end of a space occupied by occupants, whereby there have been imposed limits on the utilization of a space in the rear portion of the vehicle by the space occupied by the fuel tank.

To solve the above-described problems, it is conceivable that, in a rear engine—rear wheel drive type motor vehicle or the like for example, in which a propeller shaft does not longitudinally traverse a floor panel of the vehicle therebeneath, a tunnel upwardly projecting from the surface of the floor panel and disposed in the longitudinal direction of the vehicle is formed at the central portion in the widthwise direction of the floor panel and a fuel tank is disposed in the tunnel, so that effective utilization of the space in the rear portion of the vehicle can be enhanced and further reduced total length of the vehicle and decreased weight of the vehicle can be attained.

With the motor vehicle of the type described, there are some cases where, in a compartment, an occupant's seat disposed upwardly of the floor panel is divided by the tunnel into two right and left portions. In such cases, there has been presented the problem that a dead space is formed upwardly of the tunnel in the compartment.

Furthermore, in the motor vehicle of the type described, the fuel tank is adapted to be disposed in the vicinity of the occupant's seat, thereby presenting the problem that the flowing sounds when fuel in the fuel tank flows due to the acceleration or deceleration of the vehicle can be easily heard by the occupant.

Furthermore, in the rear engine—rear wheel drive type motor vehicle, there is provided a shift linkage extending from a speed-change control lever disposed in a space for occupants to the rear portion of the vehicle through the central portion in the widthwise direction of the vehicle, and the path of this shift linkage mut not interfere with the fuel tank in the aforesaid tunnel.

SUMMARY OF THE INVENTION

It is therefore an object of the present invention to provide a vehicle body floor construction of a motor vehicle, wherein, in the motor vehicle having the above-described construction, it is contemplated to further effectively utilize a dead space in a compartment and increase a fuel tank in capacity.

It is another object of the present invention to provide a vehicle body floor construction of a motor vehicle, wherein, in the above-described motor vehicle, it is contemplated to further effectively utilize a dead space in a compartment and increase a fuel tank in capacity, further, the degree of freedom is increased for a mounting positon of a vapor separator secured to the fuel tank, and the construction can be rendered compact.

It is a further object of the present invention to provide a vehicle body floor construction of a motor vehicle, wherein, in the motor vehicle having the above-described construction, it is contemplated to further effectively utilize a dead space in a compartment, and moreover, a fuel tank can be increased in capacity and a vapor separator of the fuel tank can be dispensed with.

Furthermore, it is a still further object to provide a vehicle body floor construction having a shift linkage extending from a speed-change control lever disposed in a space for occupants to the rear protion of the vehicle through the central portion in the widthwise direction of the vehicle, wherein the shift linkage and the tunnel do not interfere with each other.

It is a still more further object of the present invention to provide a vehicle floor construction of a motor vehicle, wherein the flowing sounds of fuel in a fuel tank are arrested and the floor is improved in rigidity to a considerable extent.

Additionally, it is a yet further object of the present invention to provide a vehicle body floor construction, having a shift linkage extending from a speed-change control level disposed in a space for occupants in a rear engine-rear wheel drive type motor vehicle or the like to the rear portion of the vehicle through the central portion in the widthwise direction of the vehicle, wherein the flowing sounds of fuel in a fuel tank is arrested, the floor is improved in rigidity to a considerable extent, and the path of a shift linkage is secured.

To achieve one of the above-described objects, according to the present invention, the tunnel upwardly projecting from the surface of the floor panel and disposed in the longitudinal direction of the vehicle is formed at the central portion in the widthwise direction of the floor panel, the fuel tank is disposed in the tunnel, and the upper surface of the top portion of the tunnel on the interior side of the compartment is upwardly displaced at least on one side of the occupant's seat.

To achieve one of the above-described objects, according to the present invention, the upper surface of the tunnel is made high enough so that the upper surface can serve as an arm rest for an occupant at one side of the occupant's seat.

To achieve one of the above-described objects, according to the present invention, a reinforcing member is connected at the rear end thereof to a back panel, adjacent at the forward end thereof to a dash panel and at opposite ends thereof to the floor panel, respectively, and is mounted on the interior side of the tunnel, whereby the upper surface of the top portion of the tunnel on the interior of the compartment is displaced upwardly.

To achieve one of the above-described objects, according to the present invention, in the above-described vehicle body floor construction of the motor vehicle, the upper surface of the tunnel on the interior of the compartment is made lower than a shift linkage in the vicinity of a speed-change control lever by a driver's seat and the upper surface of the fuel tank is progressively increased in height toward the rear portion of the vehicle.

To achieve one of the above-described objects, according to the present invention, the upper surface of the tunnel is made lower than the shift linkage in the vicinity of the speed-change control lever by the driver's seat, made high enough so that the upper surface can serve as an arm rest for an occupant from one side of the driver's seat toward the rear, and the fuel tank is made to have a substantially mountain-shape having the maximum height at the substantially central portion in the longitudinal direction thereof.

To achieve one of the above-described objects, according to the present invention, in the vehicle body floor construction having a shift linkage extending from a speed-change control lever dispoed in a space for the occupants to the rear portion of the vehicle through the central portion in the widthwise direction of the vehicle, the tunnel upwardly projecting from the surface of the floor panel and disposed in the longitudinal direction of the vehicle is formed at the central portion in the widthwise direction of the floor panel, the fuel tank is disposed in the tunnel, the tunnel and the fuel tank are lower than the shift linkage in the vicinity of the speed-change control lever and the fuel tank upwardly projects higher than the shift linkage at the portions thereof rearwardly of the vicinity of the speed-change control lever so that it does not interfere with the shift linkage, and the shift linkage is passed through a closed cross-section formed between the inner surface of the tunnel and the outer surface of the tank and through-holes formed in front and at the back of the closed cross-section.

Furthermore, to achieve one of the above-described objects, according to the present invention, in the vehicle body floor construction of the motor vehicle, having the shift linkage extending from the speed-change control lever disposed in the space for the occupants to the rear portion of the vehicle through the central portion in the widthwise direction of the vehicle, the tunnel upwardly projecting from the surface of the floor panel and disposed in the longitudinal direction of the vehicle is formed at the central portion in the widthwise direction of the floor panel, the fuel tank is disposed in the tunnel, the reinforcing member is connected at the rear end thereof to the back panel, adjacent at the forward end thereof to the dash panel and at opposite ends thereof to said floor panel, respectively, and is mounted on the interior side of the tunnel, the tunnel and the fuel tank are lower than said shift linkage in the vicinity of the speed-change control lever and upwardly project higher than the shift linkage at the portions thereof rearwardly of the vicinity of the speed-change control lever so as not to interfere with the shift linkage, and the shift linkage is passed through a closed cross-section formed between the inner surface of the reinforcing member secured to the upper portion of the tunnel and the outer surface of the tunnel and through-holes formed in front and at the back of the closed cross-section.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Figure 1:
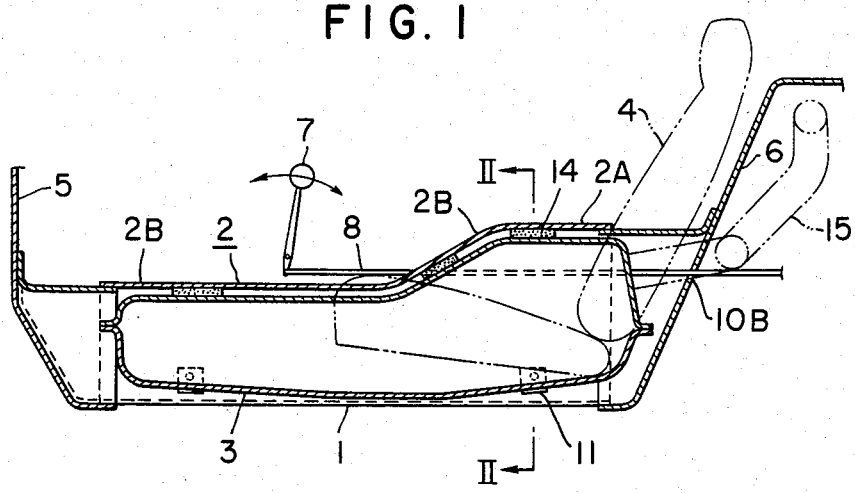
FIG. 1 is a schematic sectional view showing an embodiment of the vehicle body floor construction of the motor vehicle according to the present invention.
Figure 2:
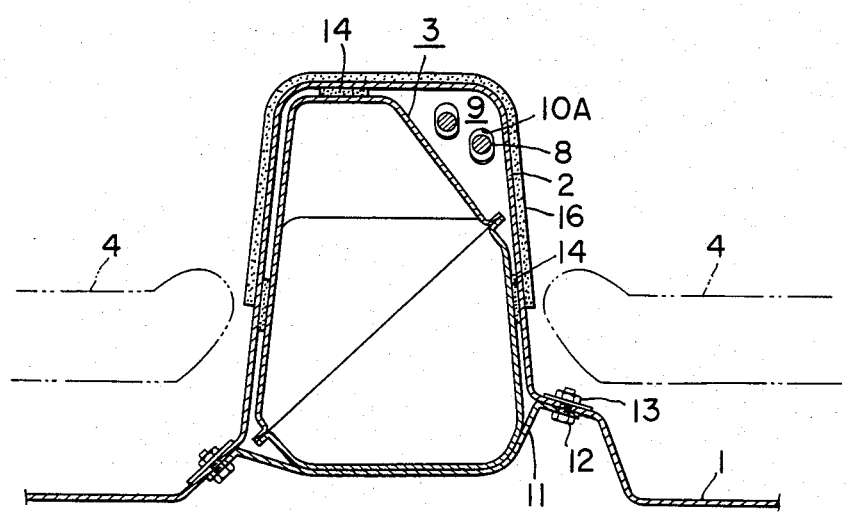
FIG. 2 is an enlarged sectional view taken along the line II—II in FIG. 1.

As shown in FIGS. 1 to 3, with a first embodiment, a tunnel 2 upwardly projecting from the surface of a floor panel 1 and disposed in the longitudinal direction of the vehicle is formed at the central portion in the widthwise direction of the floor panel 1 of a rear engine—rear wheel drive type two-seater motor vehicle, a fuel tank 3 is disposed in the tunnel 2 and the tunnel 2 is made to serve as an armrest for an occupant at the upper surface 2A thereof at an inner side of an occupant's seat 4.

In the drawings, reference numeral 5 indicates a dash panel, 6 a back panel, 7 a speed-change control lever and 8 a shift linkage for connecting this speed-change control lever 7 to a speed-change gear, not shown, in the rear portion of the vehicle, respectively.

The upper surface 2A of the aforesaid tunnel 2 is made lower than the shift linkage 8 at the side portion of the occupant's seat 4 and forward therefrom so that the upper surface 2A does not interfere with the speed-change control lever 7 and the shift linkage 8. Additionally, at the rear end of the tunnel 2, the upper surface 2A is connected to the aforesaid back panel 6 in a state where the upper surface 2A maintains such a height as can serve as the arm rest.

Furthermore, the aforesaid fuel tank 3 is made to have a an upper surface following the upper surface 2A of the aforesaid tunnel 2 and is upwardly bulged out at the side portion of the occupant's seat 4.

Here, as shown in FIG. 2, in the aforesaid fuel tank 3, the expansion thereof in the right shoulder portion as viewed in the drawing is recessed, whereby a shift linkage 8 is passed therethrough.

More specifically, at the right upper portion of the fuel tank 3, there is formed a closed cross-section 9 between the inner surface of the aforesaid tunnel 2 and the right upper portion of the fuel tank, the aforesaid shift linkage 8 is passed through a through-hole 10A formed along an inclined surface 2B formed by the elevation of the tunnel 2 from the forward portion to the rear portion thereof, a through-hole 10B formed in the back panel 6 and the aforesaid cross-section 9 and reaches the speed-change gear.

Furthermore, the aforesaid fuel tank 3 is fastened to and supported by the bottom surfaces of the floor panel 1 through tank bands 11 by means of bolts 12 and nuts 13 at two positions in the longitudinal direction thereof.

In the drawing, reference numeral 14 indicates a shock absorbing material interposed between the upper and side surfaces of the fuel tank 3 and the inner surface of the aforesaid tunnel, 15 an inlet pipe mounted at the upper rear end portion of the fuel tank 3 and 16 a floor carpet, respectively.

In the case of the above-described embodiment, a dead space at one side of the occupant's seat is effectively utilized so that the fuel tank can be increased in capacity and the upper surface of the tunnel can be used as the arm rest, thereby offering the advantage that a floor console box can be dispensed with.

Figure 3A:
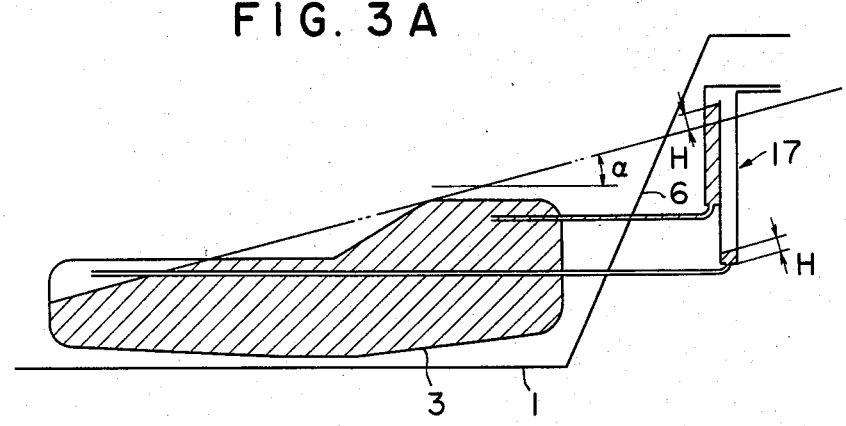
FIG. 3A is an explanatory view showing the operation of the aforesaid embodiment.
Figure 3B:
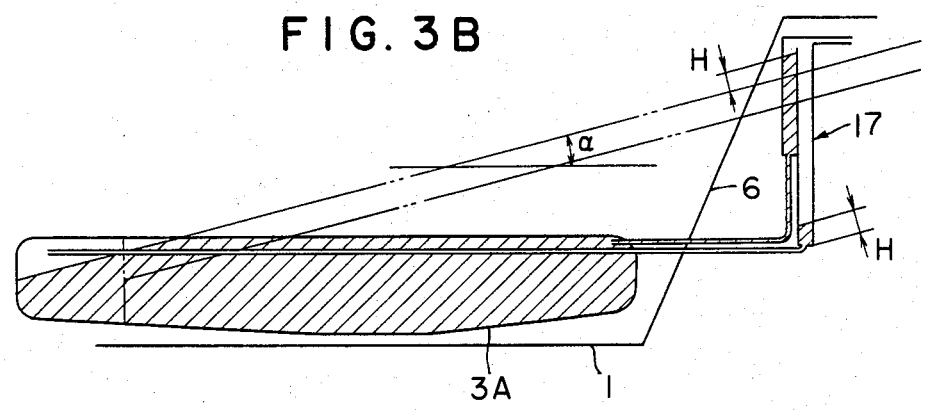
FIG. 3B is an explanatory view showing the operation of a fuel tank having a uniform height.

Since the fuel tank 3 is upwardly bulged out to a large extent at the inner side of the occupant's seat, such advantages can be offered that the total length of the fuel tank is reduced, and, as compared with the case of a fuel tank 3A having a uniform height as shown in FIG. 3B, a difference in water head H from the atmospheric pressure with respect to an inclination $\alpha$ of one and the same vehicle can be decreased and the piping in the tank can be reduced in length as shown in FIG. 3A, so that a vapor separator 17 can be reduced in length and height and the degree of freedom for a mounting position thereof can be increased.

Figure 4:
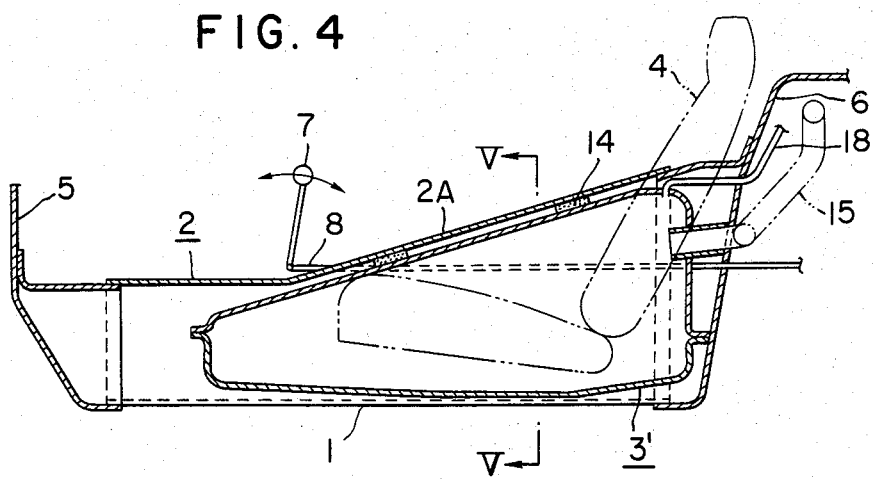
FIG. 4 is a schematic sectional view showing a second embodiment of the present invention.
Figure 5:
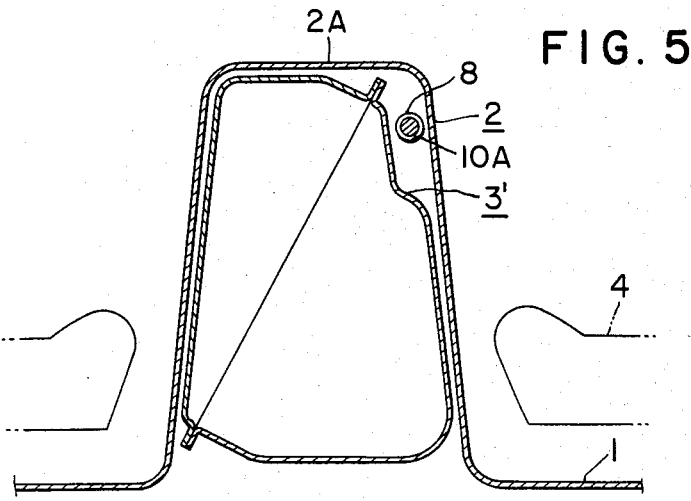
FIG. 5 is an enlarged sectional view taken along the line V—V in FIG. 4.
Figure 6:
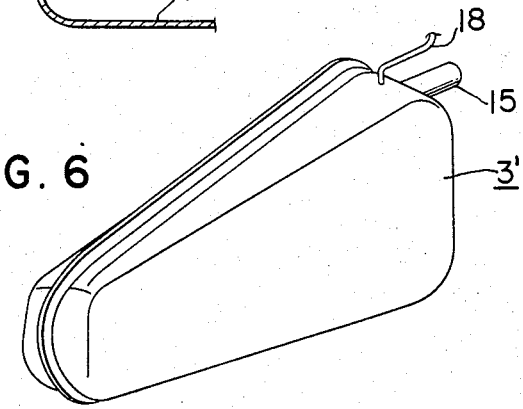
FIG. 6 is a perspective view showing the fuel tank in the aforesaid embodiment.

Description will now be given to the second embodiment of the present invention as shown in FIGS. 4 through 6.

In this embodiment, the upper surface 2A of the tunnel 2 is progressively increased in height from the vicinity of the speed-change control lever to the rear, and the fuel tank 3' disposed in the tunnel 2 is formed into a side surface shape being of a substantially triangular shape increased in height rearward.

In this embodiment, the rearmost portion of the fuel tank 3" is the highest portion. A bent tube 18 is secured to the highest portion and the inlet pipe 15 is secured to the tank 3" beneath the bent tube 18. The rearmost, highest portion of the fuel tank 3" cannot be filled with liquid fuel due to the presence of the inlet pipe 15, thus enabling the vapor separator to be eliminated.

Additionally, the advantage of further improving the effective utilization of the dead space at one side of the occupant's seat can be offered.

Figure 7:
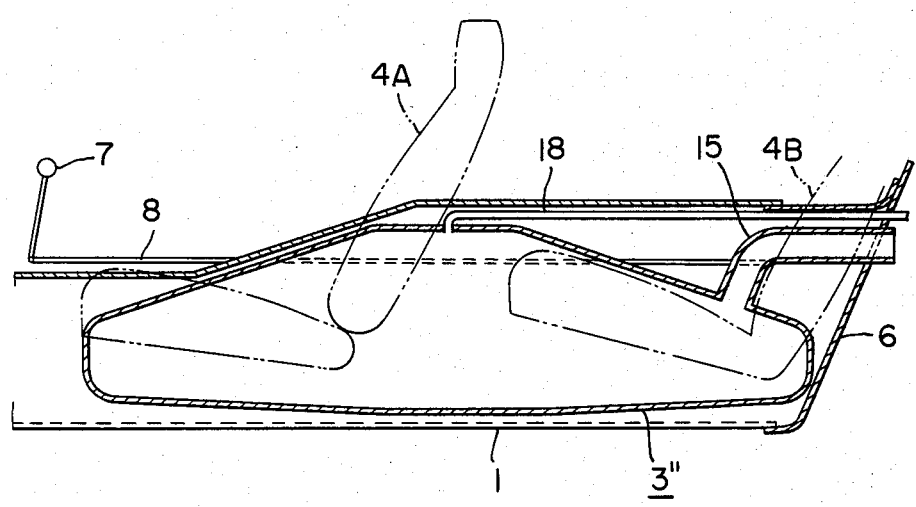
FIG. 7 is a schematic sectional view showing a third embodiment of the present invention.
Figure 8:
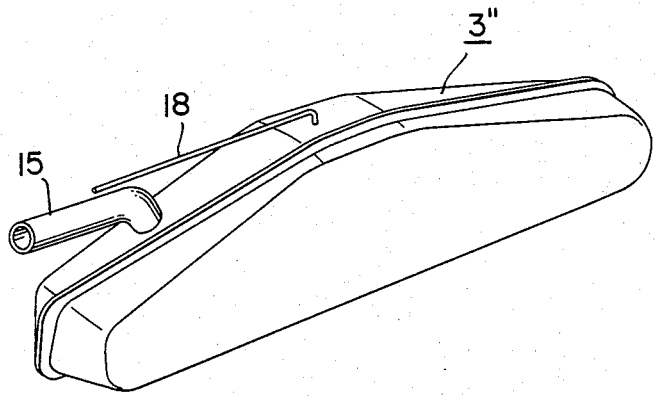
FIG. 8 is a perspective view showing the fuel tank in the aforesaid embodiment.

Description will hereunder be given of the third embodiment of the present invention as shown in FIGS. 7 and 8.

In this embodiment, the motor vehicle to which is to be applied the present invention is made to be a four-seater type motor vehicle, in which the surface 2A of the tunnel 2 is made to have such a height as can serve as the arm rest for the occupant from one side of a driver's seat 4A to the back panel 6 through the side of a rear seat. Furthermore, the fuel tank 3" is formed into a side surface shape of a substantially mountain-shape being highest at the central portion thereof, and the bent tube 18 is secured to the top surface of the fuel tank.

In the case of this embodiment, such advantages can be offered that the vapor separator of the fuel tank 3" can be dispensed with and the upper surface 2A of the tunnel 2 can be utilized as the perfect arm rest at the rear seat 4B.

With the above-described arrangement, the present invention can offer the outstanding advantages that the dead space at one side of the occupant's seat in the compartment can be effectively utilized and the fuel tank can be increased in capacity.

As shown in FIGS. 9 to 12, in the fourth embodiment, in a motor vehicle (for example, a rear engine—rear wheel drive type motor vehicle), having the shift linkage 8 extending from the speed-change control lever 7 disposed in a space for occupants in the motor vehicle to the rear portion of the vehicle through the central portion in the widthwise direction of the vehicle, wherein the tunnel 2 upwardly projecting from the surface of the floor panel 1 and disposed in the longitudinal direction of the vehicle is formed at the central portion in the widthwise direction of the floor panel 1, the fuel tank 3''' is disposed in the tunnel 2, a reinforcing member 19 being connected at the end thereof to the back panel 6, adjacent at the forward end thereof to the dash panel 5 and at opposite ends thereof to the floor panel 1, respectively, is mounted on the interior side of the tunnel 2, the tunnel 2 and the fuel tank 3''' are lower than the shift linkage 8 in the vicinity of the speed-change control lever 7 and are recessed at one side of the top portion thereof and upwardly project higher than the shift linkage 8 at the portions thereof rearwardly of the vicinity of the speed-change control lever 7 whereby the tunnel 2 and the fuel tank 3 do not interfere with the shift linkage 8, and the shift linkage 8 is passed through a closed cross-section 20 formed between the inner surface of the reinforcing member 19 secured to the upper portion of the tunnel 2 and the outer surface of the tunnel 2 and passed through through-holes 21 and 22 formed in front and at the back of the closed cross-section 20.

At one side of the occupant's seat 4, the tunnel 2 upwardly projects to such an extent that upper surface of the tunnel 2 can serve as an arm rest for an occupant, and the fuel tank 3''' being in contact with the inner surface of the tunnel 2 through the shock absorbing material 14 also projects upwardly in accordance with the tunnel 2.

The upper surface of the tunnel 2 and the fuel tank 3''' are made higher than the shift linkage 8, however, the upper right shoulder portions thereof which would otherwise interfere with the shift linkage 8 are restricted in projection in the range of the widthwise direction.

The aforesaid reinforcing member 19 is secured to the upper and side portions of the tunnel 2, covering the restrictedly projecting portion of the tunnel 2 in such a manner that the outer shape of the tunnel 2 can be symmetrical.

The aforesaid through-hole 21 is formed in an inclined surface 19A extending from the forward portion to the side portion of the occupant's seat 4 on the upper surface of the reinforcing member 19, and the through-hole 22 is formed in the back panel 6, to which the tunnel 2 and the rear end of the reinforcing member 19 are connected, in a position being in alignment with the aforesaid through-hole 21.

Figure 9:
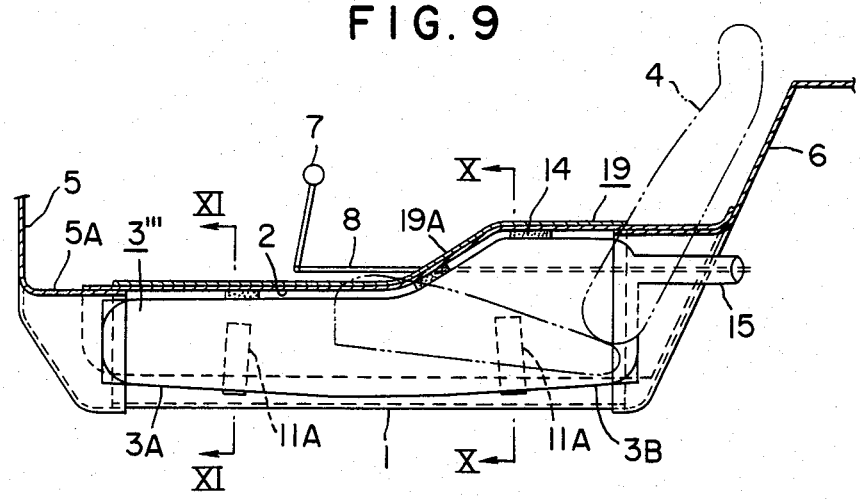
FIG. 9 is a schematic sectinal view showing a fourth embodiment of the vehicle body floor construction of the motor vehicle according to the present invention.
Figure 10:
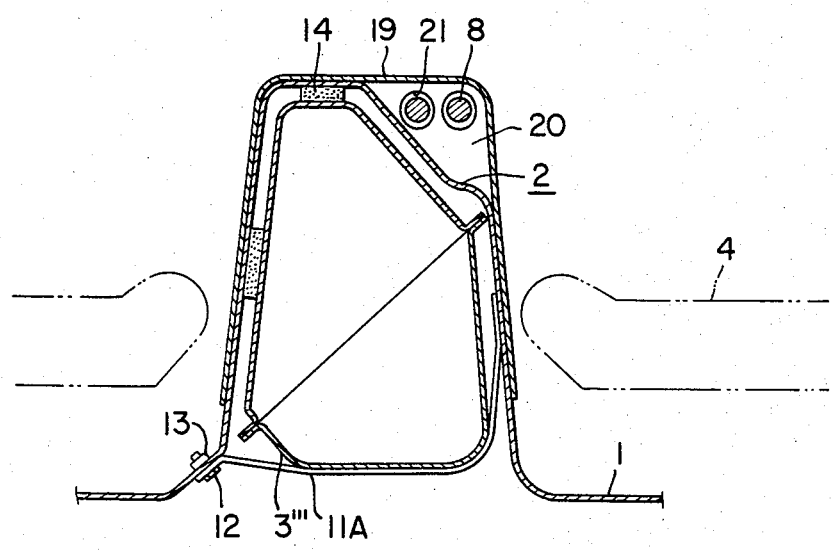
FIG. 10 is an enlarged sectional view taken along the line X—X in FIG. 9.
Figure 11:
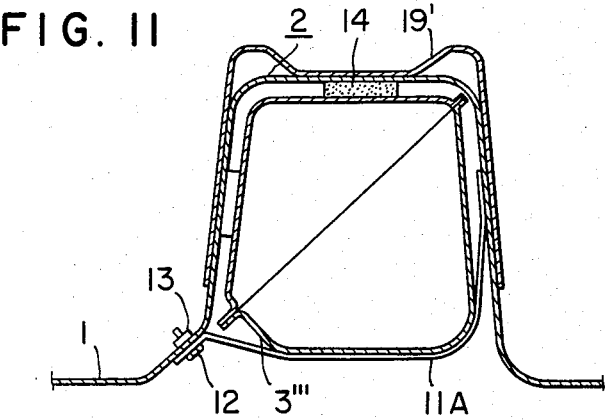
FIG. 11 is an enlarged sectional view taken along the line XI—XI in FIG. 9.
Figure 12:
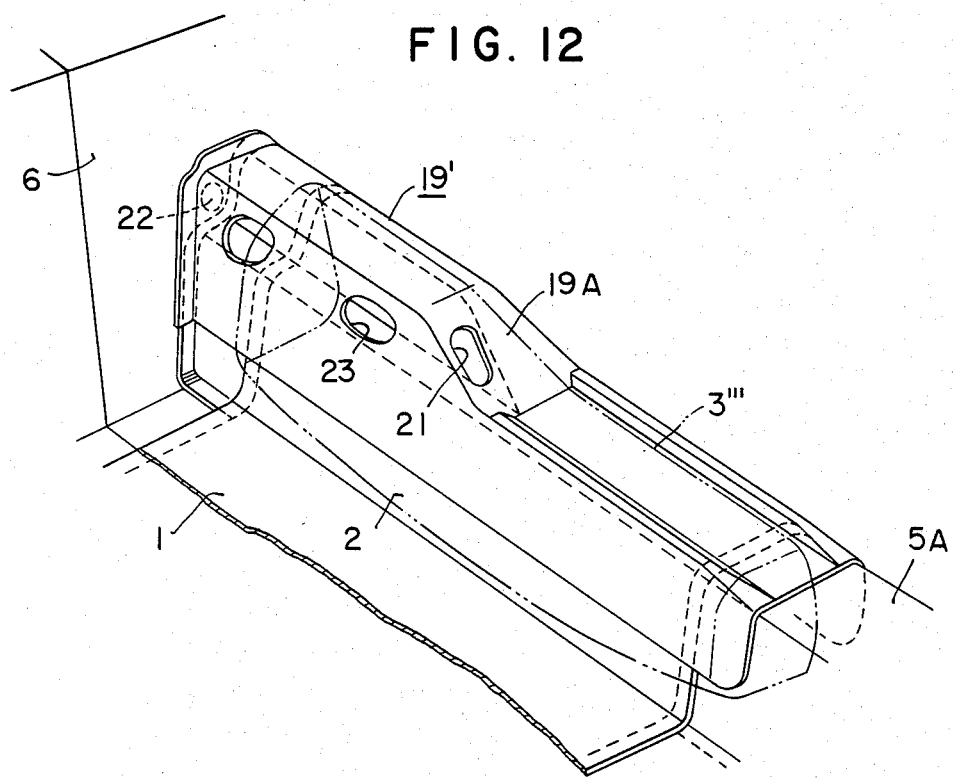
FIG. 12 is a perspective view showing the essential portions of the aforesaid embodiment.

Reference numeral 23 in FIG. 12 indicates a working hole formed in the outer side surface of the reinforcing member 19', and reference numeral 11A in FIG. 10 designate a tank band for supporting the fuel tank 3'''. The right end of the tank band 11A in FIG. 10 is welded to the neighborhood of the central portion in the direction of height of the inner side surface of the tunnel 2, and the other end is tightened and secured to the aforesaid floor panel 1 through the bolt 12 and the nut 13. The tank bands 11A are disposed at two positions in the longitudinal direction of the fuel tank 3 as shown in FIG. 9, and the bottom surfaces 3A and 3B of the fuel tank 3''' are recessed as shown in the drawing, whereby the fuel tank 3''' is supported by the tank bands 11A engaged with the recessed bottom surfaces 3A and 3B lest the fuel tank 3''' should move in the longitudinal direction thereof.

This embodiment can offer such advantages that the floor panel 1 is improved in rigidity in the tunnel 2 portion to a considerable extent by the reinforcing member 19', the flowing sounds of fuel in the fuel tank 3''' disposed in the tunnel 2 is effectively arrested, and the path of the shift linkage 8 can be secured in a simplified construction of a substantially straight-lined shape without requiring for forming holes in the floor panel 1 or the tunnel 2.

In addition, in the above-described embodiment, the reinforcing member 19' is connected at the rear end thereof to the back panel 6, adjacent at the other end to the dash panel 5, and connected only to a front extension panel 5A, however, this reinforcing member 19' may be any one which can increase the floor rigidity and arrest the flowing sounds of fuel in the fuel tank 3, and accordingly, the length thereof should not necessarily be limited to one in this embodiment.

Furthermore, the above-described embodiment is of the rear engine—rear wheel drive type motor vehicle, however, the present invention is applicable to a front engine—front wheel drive type motor vehicle. In this case, the shift linkage 8 connected to the speed-chane control lever 7 extends from the speed-change control lever 7 to the forward portion of the vehicle, whereby there is no need to form a closed cross-section 20 in the reinforcing member 19' and the through-holes 21 and 22 can be dispensed with.

It should be apparent of those skilled in the art that the abovedescribed embodiments are merely representative, which represent the applications of the principles of the present invention. Numerous and varied other arrangements can be readily devised by those skilled in the art without departing from the spirit and the scope of the invention.

What is claimed is:

1. A vehicle body floor construction for a motor vehicle, comprising:
   a vehicle floor panel having an upwardly projecting central portion in the widthwise direction of the vehicle, the central portion of said floor panel projecting upwardly to form a tunnel disposed in a longitudinal direction of the vehicle; and
   a fuel tank disposed in said tunnel, said fuel tank having an upper surface within said tunnel which progressively increases in height within said tunnel toward a rear portion of a vehicle;
   an upper surface of said upwardly projecting central portion forming said tunnel being located on the interior of a vehicle compartment, said upper surface of said upwardly projecting central portion and said upper surface of said fuel tank defining a closed cross-sectional area therebetween, a shift linkage coupled to a speed-change control lever mounted within the compartment, said shift linkage extending through said closed cross-sectional area, said upper surface of said upwardly projecting central portion being constructed and arranged to form an armrest for an occupant extending from an inner side of a seat within the compartment toward the rear of the vehicle.

2. In a motor vehicle having a front, a rear, a longitudinal direction, a floor panel and occupant seats within a vehicle compartment, the improvement in said floor panel comprising:
   a central portion of said floor panel projecting upwardly to form a tunnel extending in a longitudinal direction of said vehicle between said front and rear and adjacent to said occupant seats, said central portion having an upper surface having a first height and a second height, said second height of said upper surface being such that said central portion forms an armrest adjacent said occupant seats;
   a fuel tank disposed within said tunnel formed by said central portion and extending in a longitudinal direction of said tunnel; and
   a speed-change control lever mounted within said compartment and having a shift linkage which extends from the front of said vehicle to the rear of said vehicle, said first height of said upper surface being lower than said shift linkage and said central portion including through-holes through which said linkage extends to within said tunnel beneath said upper surface having a second height, said fuel tank and said upper surface having a second height being constructed and arranged adjacent said linkage to form a closed cross-sectional space through which said linkage extends without interference by said fuel tank.

3. The motor vehicle of claim 2 wherein said central portion between said upper surface of said first and second height is tapered to form a tunnel increasing in height from the front to the rear of said vehicle in the longitudinal direction, said fuel tank being constructed and arranged to likewise taper in height to increase in height from the front to rear of the vehicle.

4. A vehicle body floor construction of a motor vehicle comprising:
   a vehicle floor panel normally mounted within a motor vehicle and having an upwardly projecting central portion in the widthwise direction of a vehicle, said upwardly projecting central portion forming a tunnel disposed in a longitudinal direction of a vehicle;
   a speed-change control lever coupled to said floor panel within an occupant compartment of a vehicle and having a shift linkage extending from a front portion to a rear portion of a vehicle; and
   a fuel tank disposed within said tunnel, said fuel tank and said upwardly projecting central portion forming said tunnel being constructed and arranged to be lower in height than the shift linkage at a position adjacent said speed-change control lever and said fuel tank and said upwardly projecting central portion forming said tunnel being constructed and arranged to project upwardly to a height higher than said shift linkage in a rearward direction from said speed-change control lever, said fuel tank and said upwardly projecting central portion forming said tunnel being constructed and arranged to form a closed cross-sectional area between an inner surface of said tunnel and an outer surface of said fuel tank and said upwardly projecting central portion including through-holes such that said shift linkage extends through said through-holes and through the closed cross-sectional area so that the fuel tank does not interfere with said shift linkage.

5. A vehicle body floor construction of a motor vehicle as set forth in claim 4, wherein said upwardly projecting central portion forming said tunnel is constructed and arranged to have an upper surface of a height so that it forms an armrest for an occupant at an inner side of an occupant's seat within a vehicle.

6. A vehicle body floor construction of a motor vehicle comprising:

a vehicle floor panel normally mounted within a motor vehicle and having a front portion, a rear portion, and an upwardly projecting central portion in the widthwise direction of a vehicle, said upwardly projecting central portion forming a tunnel disposed in a longitudinal direction of a vehicle;

a speed-change control lever coupled to said floor panel within an occupant compartment of a vehicle and having a shift linkage extending from a front portion to a rear portion of a vehicle;

a fuel tank disposed within said tunnel, said fuel tank and said upwardly projecting central portion forming said tunnel being constructed and arranged to be lower in height than the shift linkage at a position adjacent said speed-change control lever and said fuel tank and said upwardly projecting central portion forming said tunnel being constructed and arranged to project upwardly to a height higher than said shift linkage in a rearward direction from said speed-change control lever;

a back panel coupled adjacent the rear portion of said floor panel;

a dash panel coupled adjacent the front portion of said floor panel; and a reinforcing member coupled at a rear end thereof to said back panel and mounted over said upwardly projecting central portion forming said tunnel and coupled at opposite ends thereof to said floor panel; said fuel tank and said upwardly projecting portion forming said tunnel being constructed and arranged to form a closed cross-sectional area between said reinforcing member and said upwardly projecting central portion, said reinforcing member including through-holes such that said shift linkage extends through said through-holes and through the closed cross-sectional area so that the fuel tank and upwardly projecting central portion do not interfere with said shift linkage.

7. A vehicle body floor construction of a motor vehicle as set forth in claim 6, wherein said central portion forming said tunnel is constructed and arranged to have an upper surface of a height so that it forms an armrest for an occupant at an inner side of an occupant's seat within a vehicle.

* * * * *